(12) United States Patent
Rosenberg

(10) Patent No.: US 8,571,933 B2
(45) Date of Patent: Oct. 29, 2013

(54) ADVERTISEMENTS IN A TELEVISION RECORDATION SYSTEM

(75) Inventor: Scott Rosenberg, Somerville, MA (US)

(73) Assignee: The DIRECTV Group, Inc., El Segundo, CA (US)

( * ) Notice: Subject to any disclaimer, the term of this patent is extended or adjusted under 35 U.S.C. 154(b) by 2803 days.

(21) Appl. No.: 10/033,401

(22) Filed: Dec. 26, 2001

(65) Prior Publication Data

US 2002/0090198 A1    Jul. 11, 2002

Related U.S. Application Data

(63) Continuation-in-part of application No. 09/978,144, filed on Oct. 15, 2001.

(60) Provisional application No. 60/258,671, filed on Dec. 27, 2000.

(51) Int. Cl.
*G06Q 30/00*    (2012.01)

(52) U.S. Cl.
USPC ............ 705/14.58; 705/14.61; 705/14.4

(58) Field of Classification Search
USPC .................. 705/14.58, 14.61, 14.4
See application file for complete search history.

(56) References Cited

U.S. PATENT DOCUMENTS

| | | | | |
|---|---|---|---|---|
| 5,272,525 A | * | 12/1993 | Borchardt et al. | 348/729 |
| 5,333,091 A | | 7/1994 | Iggulden et al. | 360/14.1 |
| 5,455,630 A | | 10/1995 | McFarland et al. | 348/476 |
| 5,543,743 A | | 8/1996 | Cooper | |
| 5,600,366 A | | 2/1997 | Schulman | |
| 5,610,653 A | | 3/1997 | Abecassis | |
| 5,652,615 A | | 7/1997 | Bryant et al. | |
| 5,661,516 A | | 8/1997 | Carles | |
| 5,664,948 A | | 9/1997 | Dimitriadis et al. | |
| 5,692,093 A | | 11/1997 | Iggulden et al. | 386/46 |
| 5,696,866 A | | 12/1997 | Iggulden et al. | 386/46 |
| 5,708,776 A | | 1/1998 | Kikinis | |
| 5,740,549 A | | 4/1998 | Reilly et al. | |
| 5,758,257 A | | 5/1998 | Herz et al. | |
| 5,774,170 A | | 6/1998 | Hite et al. | |
| 5,781,228 A | | 7/1998 | Sposato | |
| 5,826,168 A | | 10/1998 | Inoue et al. | |

(Continued)

FOREIGN PATENT DOCUMENTS

| | | |
|---|---|---|
| AU | 694568 | 3/1996 |
| AU | B 36802/95 | 7/1998 |

(Continued)

OTHER PUBLICATIONS

CNN.com, [online], [retrieved Dec. 6, 2001]. Retrieved from the Internet: <URL:http://www.cnn.com>.

(Continued)

*Primary Examiner* — Michael Bekerman
(74) *Attorney, Agent, or Firm* — McDonnell Boehnen Hulbert & Berghoff LLP

(57) ABSTRACT

The present invention discloses a method and system for types of ad placement opportunities in a digital video stream. The described embodiments of the invention increases ad placement opportunities to a targeted audience by using real-time ad placement during mode changes in a dynamic digital medium such as a digital video recorder. Various embodiments also allow various types of temporal overlapping and composite display techniques for viewing ads and video content.

21 Claims, 5 Drawing Sheets

Ad Placement Flow Chart

(56) References Cited

U.S. PATENT DOCUMENTS

| | | | |
|---|---|---|---|
| 5,848,397 A | 12/1998 | Marsh et al. | |
| 5,850,218 A | 12/1998 | LaJoie et al. | |
| 5,884,141 A | 3/1999 | Inoue et al. | |
| 5,886,731 A | 3/1999 | Ebisawa | |
| 5,948,061 A | 9/1999 | Merriman et al. | |
| 5,959,621 A | 9/1999 | Nawaz et al. | |
| 5,987,210 A | 11/1999 | Iggulden et al. | 386/46 |
| 5,995,092 A | 11/1999 | Yuen et al. | |
| 5,999,688 A | 12/1999 | Iggulden et al. | 386/46 |
| 6,039,574 A | 3/2000 | Standiford et al. | |
| 6,108,484 A | 8/2000 | Lim et al. | |
| 6,215,526 B1 | 4/2001 | Barton et al. | 348/473 |
| 6,233,389 B1 | 5/2001 | Barton et al. | 386/46 |
| 6,286,005 B1 | 9/2001 | Cannon | |
| 6,310,886 B1 | 10/2001 | Barton | 370/462 |
| 6,324,338 B1 | 11/2001 | Wood et al. | |
| 6,327,418 B1 | 12/2001 | Barton | |
| 6,332,127 B1 | 12/2001 | Bandera et al. | |
| 6,349,410 B1 | 2/2002 | Lortz | |
| 6,360,053 B1 | 3/2002 | Wood et al. | |
| 6,452,612 B1 | 9/2002 | Holtz et al. | |
| 7,017,173 B1 | 3/2006 | Armstrong et al. | |
| 7,039,933 B1* | 5/2006 | Chen et al. | 725/36 |
| 7,225,142 B1 | 5/2007 | Apte et al. | |
| 7,337,456 B1* | 2/2008 | Nihei | 725/35 |
| 2001/0049820 A1* | 12/2001 | Barton | 725/32 |
| 2002/0036655 A1 | 3/2002 | Yulevich et al. | |
| 2002/0072972 A1 | 6/2002 | Lamont | |
| 2002/0083439 A1 | 6/2002 | Eldering | |
| 2002/0097235 A1 | 7/2002 | Rosenberg et al. | |
| 2002/0100041 A1 | 7/2002 | Rosenberg et al. | |
| 2003/0037068 A1 | 2/2003 | Thomas et al. | |
| 2003/0195797 A1* | 10/2003 | Klug | 705/10 |
| 2005/0267994 A1 | 12/2005 | Wong et al. | |

FOREIGN PATENT DOCUMENTS

| | | |
|---|---|---|
| DE | 199 39 410 A1 | 3/2001 |
| EP | 0 693 215 B1 | 11/1998 |
| EP | 0917060 A1 | 5/1999 |
| EP | 1 071 287 A2 | 1/2001 |
| EP | 1 071 287 A3 | 3/2001 |
| WO | WO 96/08921 | 3/1996 |
| WO | WO 97/31315 | 8/1997 |
| WO | WO 98/51076 | 11/1998 |
| WO | WO 98/59493 | 12/1998 |
| WO | WO 99/04561 A | 1/1999 |
| WO | WO 99/04561 A1 | 1/1999 |
| WO | 99/52279 A1 | 10/1999 |
| WO | WO 99/52285 A1 | 10/1999 |
| WO | 00/07368 A1 | 2/2000 |
| WO | 00/18108 A2 | 3/2000 |
| WO | 00/18108 A3 | 3/2000 |
| WO | 00/28736 A1 | 5/2000 |
| WO | WO 00/44171 A1 | 7/2000 |
| WO | WO 00/56082 A1 | 9/2000 |
| WO | 00/58833 A1 | 10/2000 |
| WO | 00/58834 A1 | 10/2000 |
| WO | 00/58967 A1 | 10/2000 |
| WO | 00/59214 A1 | 10/2000 |
| WO | 00/62298 A1 | 10/2000 |
| WO | 00/62299 A1 | 10/2000 |
| WO | 00/62533 A1 | 10/2000 |
| WO | 00/67475 A1 | 11/2000 |
| WO | 01/06370 A1 | 1/2001 |
| WO | 01/22729 A1 | 3/2001 |
| WO | 01/46843 A2 | 6/2001 |
| WO | 01/47238 A2 | 6/2001 |
| WO | 01/47249 A2 | 6/2001 |
| WO | 01/47279 A2 | 6/2001 |
| WO | 01/65762 A2 | 9/2001 |
| WO | 01/65862 A2 | 9/2001 |
| WO | WO 01/76249 A1 | 10/2001 |
| WO | WO 02/33973 A2 | 4/2002 |
| WO | WO 02/33975 A2 | 4/2002 |
| WO | WO 02/056577 | 7/2002 |
| WO | 01/89203 A2 | 11/2007 |

OTHER PUBLICATIONS

International Search Report for PCT Application No. PCT US01/32169, which published as WO 02/33973, mailing date Jul. 7, 2002.

AdServer Software Solution, The Platform for Tomorrow Built on a Flexible, Extensible Business Object Framework, downloaded from the World Wide Web at http://www.doubleclick.net/ on Oct. 28, 2000, 2 pages.

* cited by examiner

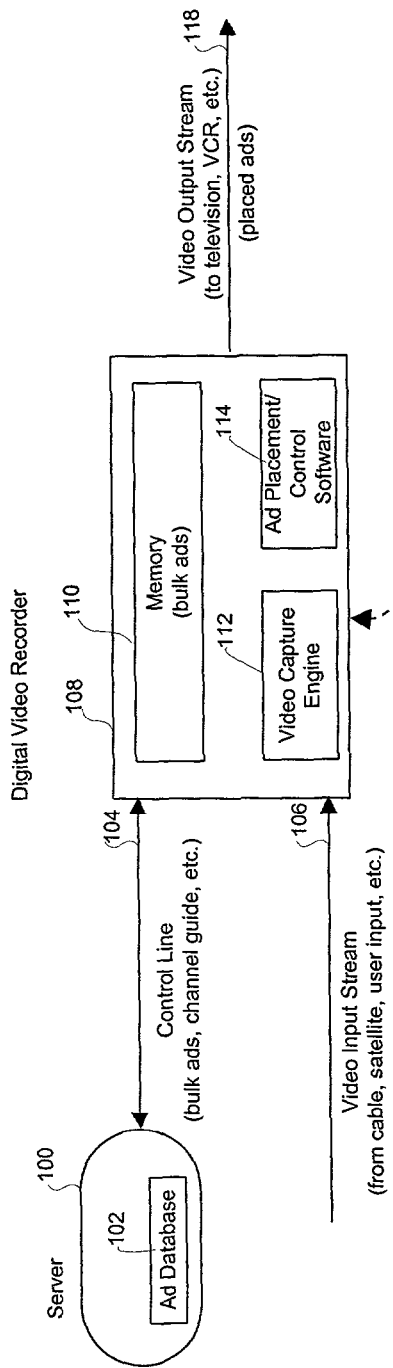
Fig. 1(a)-Digital Video Recorder Overview
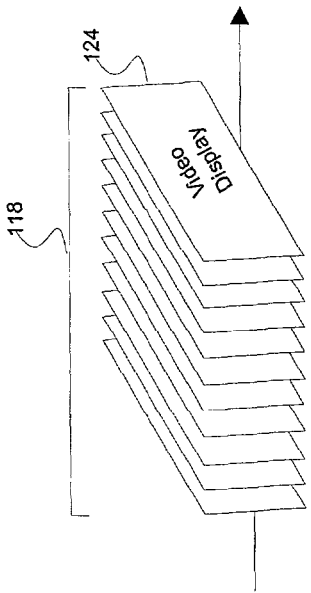
Fig. 1(b)-Video Output Stream

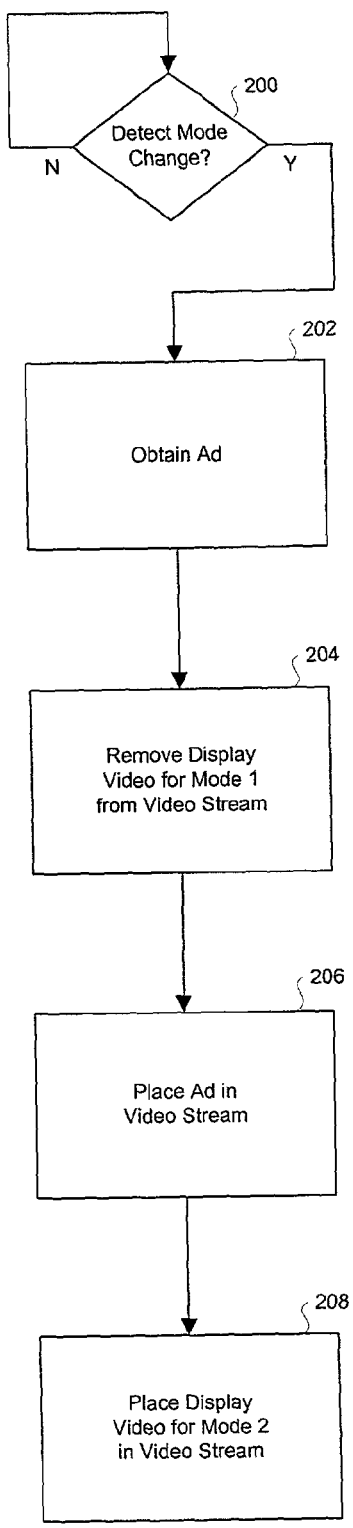
Fig. 2 - Ad Placement Flow Chart

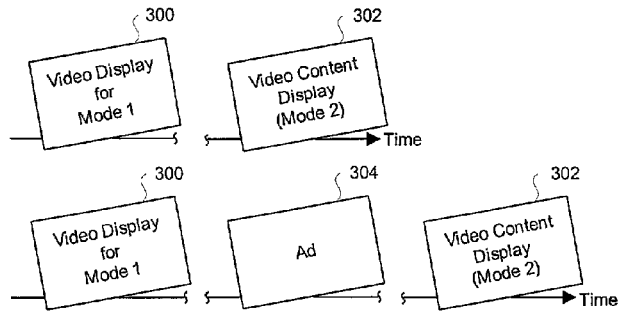
Fig. 3(a) - Lead-In Ad Placement
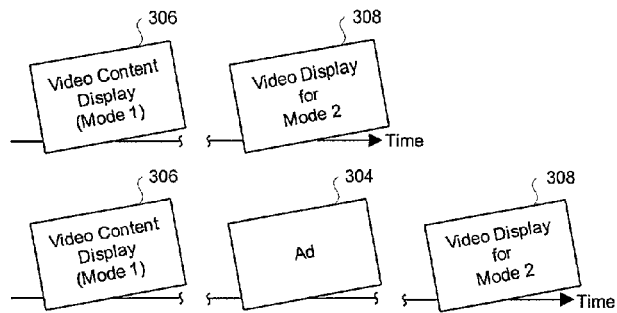
Fig. 3(b) - Lead-Out Ad Placement
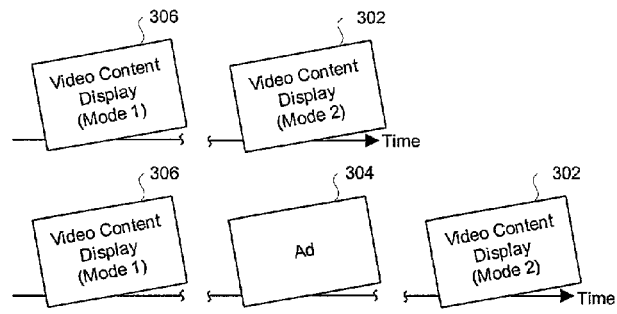
Fig. 3(c) - Quick-Skip Ad Placement
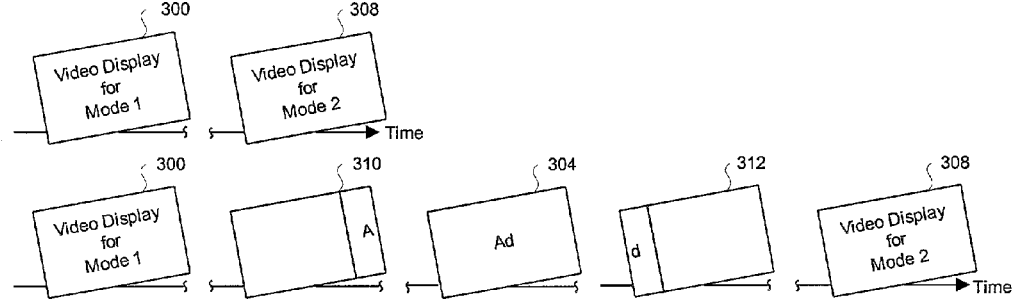
Fig. 3(d) - Transition Ad Placement

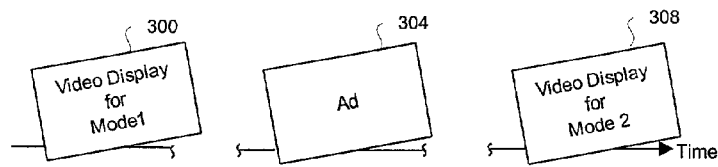
Fig. 4(a) - Video Output Stream without Overlap
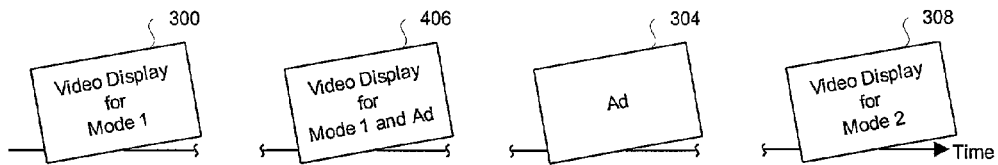
Fig. 4(b) - Video Output Stream with Overlap
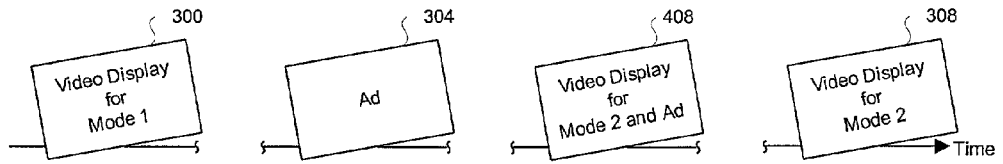
Fig. 4(c) - Video Output Stream with Overlap
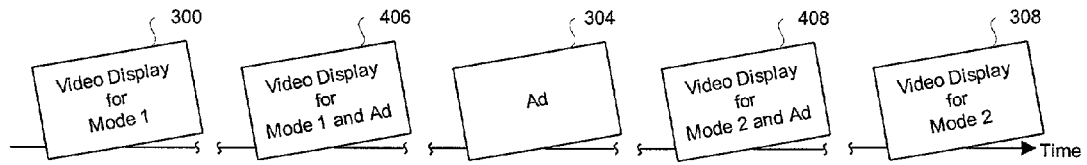
Fig. 4(d) - Video Output Stream with Overlap
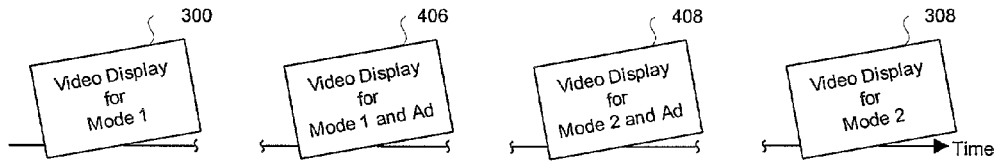
Fig. 4(e) - Video Output Stream with Overlap

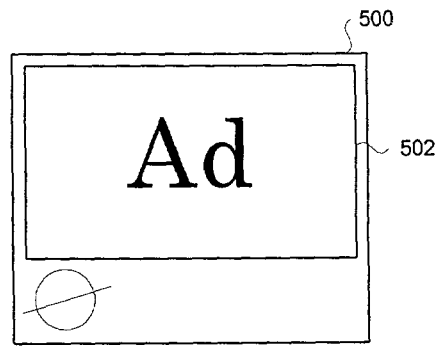
Fig. 5(a) - Full-page Ad
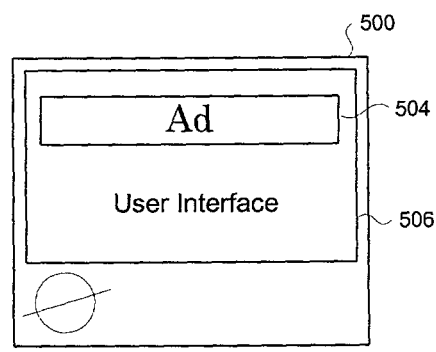
Fig. 5(b) - Banner Ad
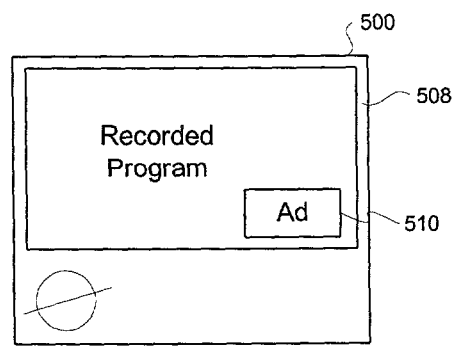
Fig. 5(c) - Mini Ad

ADVERTISEMENTS IN A TELEVISION RECORDATION SYSTEM

RELATED APPLICATIONS

This application claims priority under 35 U.S.C. §119(e) to U.S. Provisional Application No. 60/258,671, filed Dec. 27, 2000, and entitled "Advertisements in a Television Recordation System," which is incorporated by reference herein in its entirety. This application is also a continuation in part of U.S. Utility application Ser. No. 09/978,144, filed Oct. 15, 2001, and entitled "Method and System for Dynamic Ad Placement Engine," which is incorporated by reference herein in its entirety.

TECHNICAL FIELD

The present invention relates generally to digital video recorders and, more specifically, to a method and system for determining and playing ads in digital video recorders.

BACKGROUND OF THE INVENTION

Placing an advertisement ("ad") in a medium that reaches the largest target audience has long been the goal of advertisers. One way of achieving this goal is to target people through media contexts, such as video media, that attract an audience of likely customers. For instance, advertisers place movie trailer ads for upcoming movies before a main feature movie to target an audience of moviegoers. Also, advertisers place ads for upcoming or adjacent programming after a broadcast program to an audience that is already watching television on that particular channel.

The advent of VCR's (video cassette recorders) and similar technologies have changed the way that people receive video media. Through the use of time shifting, which allows video content to be viewed at a different time, viewers are able to view programs at home whenever desired. Viewers are also able to pre-select broadcast programs to be automatically recorded on a videotape medium and viewed later. Advertisers often place ads for upcoming videos on the videotape medium before a main feature to reach an audience of home movie viewers. Similarly, a recorded broadcast program captures the ads for upcoming and adjacent programs while recording the selected program to the videotape medium. In accordance with the nature of time shifting, viewers may watch a video days or even years after its original capture, and consequentially, ads on videotape are likely to be less effective in reaching a target audience. In the case of ads for adjacent television programming, the ads may become totally moot because the adjacent program has already aired by the time the ad is viewed.

The more recent advent of digital video technologies, such as the digital video recorder, has introduced random access capabilities to video viewing. Due to the serial nature of analog videotape, programs must be viewed in a sequential order. Even if a viewer chooses to fast forward beyond one program to watch a second-recorded program first, fast-forwarding necessarily continues the serial scroll through a videotape, albeit at a faster rate. Randomly accessed digital recording, on the other hand, is a medium that allows the viewer to scroll through an index of captured programs, and then choose to view them as preferred, or to not view them at all. Therefore, an ad could still become moot, or moreover, never even be viewed.

In addition, some randomly accessed mediums, such as DVD's and laser disks, have content that is fixed at the time of recording. Thus, an ad is frozen in time, making it susceptible to the same shortcomings as analog video.

The Internet represents a medium that is ever changing, and in which advertisers have used different techniques to deliver ads to target audiences. To view a web page on the Internet, a user enters the URL of the web page or clicks on a link to a web page. The web page itself is fetched from the appropriate web server, and an ad is fetched from the ad service. The ad service attempts to determine which ad to send to the viewer based on which web page the user has requested, among other factors. Because the ad service is located on the server side, the ad service generally relies on one-size-fits-all rules to determine which ads to display for a particular page request. Because the ad selection process is centrally located, performance requirements often necessitate a simplification of the logic used to select an ad.

In addition, an Internet ad service is "coupled" to the user request. An Internet ad server typically bases the ad it serves, at least partly, on the URL of the requested web page. It is also important to note that an Internet ad server needs to send an ad to the user as quickly as possible, because the user is expecting to receive the requested web page (along with any other third party content, such as ads) as soon as possible. The fact that the typical Internet ad server is time-constrained makes it more difficult for the ad server to perform elaborate methods to determine which ads to send. Overcoming this problem typically requires the use of very high-end computers to serve the ads.

Ultimately, Internet ad serving solutions are request-based. That is, an ad is served from the central server in response to a request. Because many requests are fulfilled in parallel, ads for competing products may be served for each of the separate requests. While in theory the server could track ads being served to each client and eliminate the serving of two competing ads to the same client, the centralized ad serving environment, with millions of users and with ad serving distributed over many actual servers, makes this extremely difficult.

Moreover, an Internet ad server needs to be in substantially constant communication with the Internet, since ad requests are received constantly. Such a system was not designed to work in situations where the ad-receiving client is only intermittently connected to the Internet.

Lastly, it is always desirable to advertisers to locate additional locations for ad placement.

SUMMARY OF THE INVENTION

The present invention provides a method and system for types of ad placement opportunities in a digital video stream. The described embodiments of the invention increase ad placement opportunities to a targeted audience by using real-time ad placement during mode changes in a dynamic digital medium.

In one embodiment, the ads are placed in a digital video recorder in which the viewer selects live or earlier recorded programs for playback. During various mode changes related to video playback and other transitions, ad placement software selects an appropriate ad to fill the ad placement opportunity in accordance with the type of opportunity available. In one embodiment, this selection is augmented by an ad placement engine, which categorizes and/or prioritizes ads in advance for faster and targeted placement. Additionally, the ad placement engine can use context information in its selection process to enhance the mode change information resulting in improved targeting.

Various embodiments also allow a variety of temporal overlapping and composite display techniques for viewing ads and video content. As such, a mini ad may be displayed as a partial overlay on top of the video playback being viewed by the user, allowing the mode change to continue with less delay while filling the ad opportunity.

BRIEF DESCRIPTION OF THE DRAWINGS

FIG. 1(a) is a block diagram of a digital video recorder system that can include ad placement software in accordance with the present invention.

FIG. 1(b) is a timeline illustrating a video output stream.

FIG. 2 is a flow chart of a method performed to place ads in the video stream.

FIG. 3(a) is set of timelines showing the possible types of video display occurring without ads, and also when a lead is placed in the video display.

FIG. 3(b) is a set of timelines showing the possible types of video display occurring without ads, and also when a lead-out ad is placed in the video display.

FIG. 3(c) is a set of timelines showing the possible types of video display occurring without ads, and also when a quick-skip ad is placed in the video display.

FIG. 3(d) is a set of timelines showing the possible types of video display occurring without ads, and also when a transition ad is placed in the video display.

FIG. 4(a) is a timeline showing an ad placed between two modes of video display, during a mode change, without overlapping either mode.

FIG. 4(b) is a timeline showing an ad placed between two modes of video display, during a mode change, where the ad overlaps with the first mode.

FIG. 4(c) is a timeline showing an ad placed between two modes of video display, during a mode change, where the ad overlaps with the second mode.

FIG. 4(d) is a timeline showing an ad placed between two modes of video display, during a mode change, where the ad overlaps with the first and second mode.

FIG. 4(e) is a timeline showing an ad placed between two modes of video display, during a mode change, where the ad overlaps with the first second mode, while also appearing between mode displays.

FIG. 5(a) is an example of a full-page ad.

FIG. 5(b) is an example of a banner ad appearing in combination with, in this case, a user interface.

FIG. 5(c) is an example of a mini ad appearing in combination with, in this case, a recorded program.

DETAILED DESCRIPTION OF THE DRAWINGS

1. Digital Video Recorder

FIG. 1 (a) is a block diagram of a digital video recorder system. A digital video recorder 108 is coupled in communication with a server 100 containing an ad database 102, receives a video input stream 106, and outputs a video output stream 118. The digital video recorder 108 contains ad placement software 114 coupled in communication with a memory 110, which in turn, is coupled in communication with a video capture engine 112. The video capture engine 112 receives the video input stream 106, while the video output stream 118 is output from memory 110 by other software (not shown). A viewer can control functionality in the digital video recorder 108 by using a remote control device 116 in communication with control software 114, or by similar controls on the digital video recorder 118 itself.

The digital video recorder receives source data from both the video input stream 106 and the server 100. The video input stream 106 supplies content from a variety of sources including cable, satellite, and user input. An analog video input source is received into the video capture engine 112, where it is converted to a digital format such as MPEG (Moving Pictures Experts Group) or AVI (audio video interleave) at an appropriate resolution. The resulting digital format is then stored into memory 110. A properly formatted digital video input may bypass this step, being stored directly into memory 110. Input video can be viewed as it is received or saved in memory 110 for later viewing.

Via connections to the server 100 through the control line 104, the digital video recorder 108 receives service enhancements such as bulk ads and channel guide information that are also stored in memory 110. The connection can be implemented with daily or weekly calls via a modem, with an Internet connection, with a wireless connection, or other methods well known in the art. The control line 104 is bidirectional, so that the digital video recorder 108 can also send data to the server 100, such as logs of successful ad placements, machine states, and user information.

The memory 110 is also implemented in a variety of forms well known in the art. For example, a hard drive can be used. In a scaled down embodiment, a device such as a PDA (personal desktop assistant) or cell phone, uses a removable memory such as compact flash memory. Additionally, buffers, caches, and registers are all alternate forms of memory. The bulk ads, which are a batch of downloaded ads for potential placement, are stored in memory 110 for access by ad placement software 114 in placing ads to the video output stream 118.

In an alternative embodiment, the memory 110 resides on the server 100 along with ad placement software 114 and an ad database 102. The ads are placed on the server side before being downloaded through the control line 104. Preferably, a high bandwidth connection is provided by a DSL (digital subscriber line) service or similar mechanism.

FIG. 1(b) is a timeline illustrating a video output stream. The video output stream 118 represents a synchronous flow of individual frames 124 for viewing output from the digital video recorder 108 on a display device. This document uses the term "video output stream" 118 interchangeably with the terms "display," "display video," and "video output." Video rendering hardware or software (not shown) composes the individual frames from the source data stored in memory 110. The individual frames 124 can include a display that mirrors individual frames 124 from the video input stream 106, user interface display, ads, a combination of the preceding elements, or other elements.

The video output stream 118 can be displayed to the viewer in several ways. In one example, a display device such as a television is connected directly to the digital video recorder by coaxial cable or RCA jacks. In another example, a wireless display device such as a PDA or cell phone uses Bluetooth™, or other wireless technology to connect to the digital video recorder 108. In yet another example, the digital video recorder 108 is connected to a network, such as a LAN (local access network), where it would operate as a video supplier to another digital video recorder. In a final example, the video output stream 118 itself is time shifted by being stored on another medium such as a VCR.

2. Ad Placement

FIG. 2 is a flowchart of a method performed to place ads in the video stream.

An ad opportunity arises when the control software 114 detects that the display should change modes from a first mode (or its current mode) to a second mode 200. Next, the ad placement software 114 obtains an ad for placement 202 prior to allowing the second mode to display. The display video from the first mode is removed from the video output stream 204. The ad is placed into the video stream 206 either concurrently with the previous step, or sometime afterwards. Last, the second mode is displayed either during or after the ad display 208.

The concept of an ad placement is broad. Its boundaries are defined more by the insertion of ads into opportunities created by a digital video recorder 108 than by the content and source of the ad itself. Therefore, an ad can refer to the traditional commercial ads for products that are supplied by advertisers.

These ads can be still ads, animations, or videos. An ad could also be user-input still photos and videos. As an example, in one embodiment of a transition ad in FIG. 3(d), a still ad can wipe across the screen from right to left 310, 304, and 312. Rather than using a commercial still ad, the viewer may instead configure the digital video recorder 108 to display a vacation photo to wipe across the display during transitions.

The ad placement/control software 114 resides in the digital video recorder 108. One of ordinary skill in the art will realize that the ad placement software 114 can be implemented through combinations of hardware or software. Updates to the ad placement software 114 can be downloaded from the server 100. The ad placement software 114 communicates, either directly or indirectly, with the server 100, the memory 110, the video capture engine 112, and the software that performs video rendering.

The control software 114 continuously monitors the digital video recorder 108 for ad opportunities by detecting that the output video stream should change from a first mode to second mode 200. In this embodiment, the control software requests ads from the ad placement software when an ad opportunity is detected. In other embodiments, the control software 114 and ad software 114 are combined.

The specific types of mode changes are illustrated FIGS. 3(a)-(d) and described below. In one embodiment, the digital video recorder 108 receives a user input request via the remote control device 116 to quick-skip to another point of time in the digital video segment. This is analogous to fast-forwarding or rewinding a VCR, but without having to wait to skip past the physical medium. In this embodiment, the first mode display 300 is the video playback prior to the user request to quick-skip, and the second mode display 308 is the video playback after the quick-skip ceases. An ad opportunity exists during the increment between modes, which could last several milliseconds or several minutes.

However, mode changes can also be initiated internally. For instance, the current mode may be comprised of video playback from an earlier recorded program. Once the program has ended, the digital video recorder 108 preferably is configured to automatically switch to live video playback of a cable channel or a guide of available programming. In this case, a transition mode change would occur, as illustrated in FIG. 3(c), where the first mode 300 is the video playback mode of an earlier recorded program and the second mode 308 is live video playback or the channel guide.

The ad placement software 114 prepares to dynamically fill the ad opportunity by obtaining an ad 202 in real-time. In a preferred embodiment, the ad can reside directly on the digital video recorder 108, stored in memory 110. In a separate process, the ads preferably are downloaded in bulk through the control line 104 to the digital video recorder 108 during its connection to the server 100. Because the ads are downloaded before ad opportunities arise, when the ad placement software 114 obtains an ad, response time and processor usage are reduced.

Although a bulk of ads is stored for possible placement in the separate process, it does not follow that each ad will ultimately be placed for display in the video output stream 118. For example, an ad relating to a holiday sale may be designated for placement only during a quick-skip mode change. However, if the holiday passes before that particular mode change is detected, the ad would become moot and could be deleted before being shown to the user. Thus, during a connection with the server 100, more current ads appropriate for a quick-skip mode change are downloaded to replace the expired ad. In another more universal example, the digital video recorder 108 may not be used for several weeks, thereby affording no ad placement opportunities, and causing many ad types to expire.

In an alternative embodiment, the ads remain in memory 110 on the server 100. A ad selected for placement is downloaded to the digital video recorder 108 for display in response to instructions from the ad placement software 114 resident in the client. In yet another embodiment, the memory 110 and the ad placement software 114 are included on the server-side. The control software 114 capable of detecting a mode change on the client side alerts the server of the ad opportunity. However, the ad placement occurs on the server-side prior to being downloaded and displayed by the client.

In another process, separate from actually obtaining the ads, the ads are categorized, and/or prioritized within such categories. One embodiment of this method is achieved by using an ad placement engine. Accordingly, the ad placement engine can be configured to use parameters indicating which categories a particular ad should be included in. In addition, the ads can be prioritized within a category by context information relating to a user profile or the video output stream 118.

In an embodiment using user profile information, the ad placement engine evaluates ads according to factors such as age, gender, or geographic location. In an embodiment using context information, the ad placement engine uses considers a channel change or a program change on the same channel. As it receives updated context information, the ad engine is constantly reevaluating what ad would be best to show to the user given the current viewing context. The ad engine maintains its prioritized list of ads through the use of a data structure called a data heap. In this embodiment, and ad at the to of the data heap is served next when an ad is requested from the ad placement software 114. This ad is current and appropriate for the particular mode change.

The display video from the first mode is removed from the video output stream 204. One of ordinary skill in the art recognizes that this function can be performed by software other than the ad placement software 114. Essentially, the software terminates the rendering of frames 124 from memory.

The ad is placed 206 into the video output stream either concurrently with the removing video from mode one from the display, or sometime afterwards. Placing the ad requires the software to render the individual frames 124 from their location in memory 110. If an ad is a still ad, then the same individual frame 124 is replicated enough times to fill up the designated time segment for the ad to display.

Finally, the display video from the second mode is placed into the video output stream 208 either during or after the ad display. Alternative overlap scenarios are set forth in FIGS. 4(a)-(e).

3. Ad Types

Mode changes provide ad placement opportunities. FIGS. 3(a)-(d) set forth different ad types by showing each type of mode change, and the corresponding ad placement. The modes and ads are represented as sequential snapshots in time, or display frames, of the video stream 118. These mode changes are complimented by temporal combinations set forth in FIGS. 4(*a*)-(*e*) and special combinations set forth in FIGS. 5(*b*) and (*c*).

FIG. 3(*a*) is a set of timelines showing the possible types of video display occurring without ads, and also when a lead-in ad is placed in the video display. A lead-in Mode change describes a switch from any first mode 300 to a video playback mode 302. Under ordinary operation, the digital video recorder 108 generally performs an immediate transition between operating modes. For example, in the first mode, the digital video recorder 108 would display the user interface while the viewer scrolls through an index of earlier recorded programs. A movie is selected for playback, causing the software to change modes by removing the user interface video and inserting video corresponding to the selected program or movie. The program or movie could start playback from the beginning of the segment, or alternatively, from anywhere between the beginning and end of the segment.

With the lead-in ad inserted, the process changes. When the movie is selected for playback, the control software 114 detects that the video output stream should change modes 200. By comparing the current mode with the future mode, the ad placement software 114 can identify the existence of a lead-in ad opportunity. This criterion is used in selecting the category of ads to choose from. If an ad placement engine is used as disclosed in U.S. Utility application Ser. No. 09/978, 144, the ad on top of the lead-in ads data structure is chosen. The software removes the user interface display video, places the ad, and places the movie video into the output video stream according to overlap conditions as set forth in FIGS. 4(*a*)-(*e*).

The viewer preparing to watch the requested content is a target audience for a lead-in type of ad. Advertisers can categorize ads submitted to the server 100 to reach viewers in a similar mind set. In an alternative embodiment, other context information is considered in making an ad decision. For instance, the ad placement engine takes context information into account that could include the program or movie title, type, time, or specific user information. In this case, the ad is personalized and, thus, more targeted. Since the decoupled process has already prioritized the lead-in ads, the additional context information will cause only a minimal increase in processor usage and time required to place an ad. As a result, if the viewer is watching a scary movie at 10 pm on a Saturday night, a Pizza Hut ad could be placed for geographic locations where the nearest restaurant does not close until 11 pm.

FIG. 3(*b*) is a set of timelines showing the possible types of video display occurring without ads, and also when a lead-out ad is placed in the video display. A lead-out mode change is similar to a lead-in mode change, except that the display switches from video playback mode 306 to any second mode 308. The ad placement software 114 compares modes in identifying the existence of a lead-out ad opportunity. As a result, an appropriate ad is obtained. In the movie example, when the movie segment has ended, and the user is returned to the user interface, an ad can be placed before the user interface is displayed. Returning to the ad placement engine embodiment, the ad selection is further enhanced by context changes occurring since the last re-ordering of the data heaps. For instance, the time may now be 11:30 pm, leading to an ad selection for a 24-hour convenience store or a horror movie starting at 12 am on a channel frequently watched by the viewer.

FIG. 3(*c*) is a set of timelines showing the possible types of video display occurring without ads, and also when a quick-skip ad is placed in the video display. A quick-skip mode change describes a switch from video playback mode 306 at one time to video playback mode 308 at a different time. Specifically, the digital video recorder can "fast-forward" or "rewind" through a video segment without the user having to wait for physical tape to be skipped. Here, an ad is displayed in a time interval between the two video content displays, even though it might be possible to switch from one content display to the other without a significant time lapse.

FIG. 3(*d*) is a set of timelines showing possible the types of video display occurring without ads, and also when a transition ad is placed in the video display. A transition mode change is an abstraction of other mode changes in which the display switches from any first mode 300 to any second mode 308. For instance, the display could switch from a user interface of earlier recorded programs to a user interface of live programs. In this case, an ad for upcoming programs may be appropriate. In one embodiment, the ad wipes across the screen 310, 304, and 312 from right to left. As the ad enters the right part of the display, the leftmost part of the video display for mode one moves out of the display 310 until the entire ad displays 304. Eventually, the wipe continues across by entering the video display for mode two into the right part of the display while moving the leftmost part of the ad out of the display 312. Many other types of transitions, such as fade-in/fade-out and vertical wipe, and digital dots, are also applicable here.

4. Ad Display Alternatives

There are several temporal and screen placement alternatives to ad display as illustrated by FIGS. 4(*a*)-(*e*) and FIGS. 5(*a*)-(*c*) respectively.

FIG. 4(*a*) is a timeline showing an ad placed between two modes of video display, during a mode change, without overlapping either mode. The display starts in mode one 300. The ad placement software 114 obtains an ad 202. In this case, the software removes display video for mode one 204 from the display before placing the ad in the video stream 402. Also, the software removes the ad before displaying the video for mode two 308.

In this case, the video for mode two is delayed from displaying for a period of time approximately equal to the length of the ad. For earlier recorded video playback, the software can synchronize this delay by waiting to request video data from memory 110 until the ad has been remove from the display. However, for live video playback, the video input continues in real-time as the ad displays. Thus, the live video playback is stored in memory 110 while the ad is displayed.

FIG. 4(*b*) is a timeline showing an ad placed between two modes of video display, during a mode change, where the ad overlaps with the first mode. The display starts in mode one 300. After the ad placement software 114 places the ad 206, the software continues to display video for mode one 406. Sometime thereafter, that video for mode one is removed from the display 204, leaving the ad to display alone 304. After the ad has completed, display video for mode two is displayed 308.

FIG. 4(*c*) is a timeline showing an ad placed between two modes of video display, during a mode change, where the ad overlaps with the second mode. The display starts in mode one 300. After the ad placement software obtains the ad 202, it is not displayed until video display for mode one is removed from the display 204, leaving the ad to display alone 304. Sometime thereafter, the ad is displayed along with the video display for mode two 408. After the ad has completed, display video for mode two is displayed alone 308.

FIG. 4(*d*) is a timeline showing an ad placed between two modes of video display, during a mode change, where the ad overlaps with the first and second mode. The display starts in mode one 300. After obtaining the ad 202, the ad placement software 114 places the ad in the display stream along with video display for mode one 406. Sometime thereafter, the video display for mode one is removed 204, allowing the ad to display alone 304. The video display for mode two is then displayed along with the ad 408. Sometime thereafter, the ad is removed from the display, now leaving video display for mode two to display alone 308.

FIG. 4(e) is a timeline showing an ad placed between two modes of video display, during a mode change, where the ad overlaps with the first second mode, while also appearing between mode displays. The display starts in mode one 300. After obtaining the ad 202, the ad placement software 114 places the ad in the display stream 206 along with video display for mode one 406. Sometime thereafter, video display for mode one is removed 204 at the same time that video display for mode two is displayed 308.

FIG. 5(a) is an example of a full-page ad. While the ad is placed, it occupies the entire display 502. In this embodiment, the display demands the full attention of the viewer waiting for the display for mode two 308.

FIG. 5(b) is an example of a banner ad appearing in combination with, in this case, a user interface. While the ad is displayed, it occupies less than the entire screen 504. This type of ad is less obtrusive than a full-page ad, and allows combined displays. In this embodiment, the user can view the display, such as the user interface, along with the ad. A banner ad 504 may be appropriate in this example, since it can be crafted to be consistent with elements of the user interface that display program information horizontally across the screen.

Another feature of ads that take up less than the entire screen is that several ads can be displayed at the same time. For instance, along with a banner ad at the top of the display, an additional banner ad, or mini ad as shown in FIG. 5(c) is placed on the bottom of the display. Moreover, a banner ad can be vertical, of move around the screen in a non-static manner.

FIG. 5(c) is an example of a mini ad appearing in combination with, in this case, a recorded program. While the ad is displayed, it occupies substantially less than the entire screen 508. In one embodiment, the borders are transparent and the ad itself is partially transparent. This type of ad display is the least obtrusive. In the quick-skip embodiment, a mini ad 510 is advantageous in this setting because the display retains a maximum amount of screen display while the viewer fast-forwards and rewinds to a specific location in the video segment.

In summary, the described embodiments of the present invention allow a variety of ad placement opportunities in a digital video recorder. In one embodiment, these ads are chosen dynamically, based on the context in which the ad will be displayed. Various embodiments also allow various types of overlapping techniques for display of ads and video content. The foregoing discussion discloses and describes exemplary method sand embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims and equivalents.

I claim:

1. A method of placing an ad into a digital video output stream of a digital video recorder (DVR), the method comprising:

while the digital video output stream of the (DVR) includes an index of programs recorded at the DVR but does not include the ad or video of a program recorded at the DVR, the DVR detecting that the digital video output stream should change from the index of programs recorded at the DVR to the video of the program recorded at the DVR;

the DVR obtaining the ad;

the DVR placing the ad into the digital video output stream so that the digital video output stream simultaneously includes the index of programs recorded at the DVR and the ad but does not include the video of the program recorded at the DVR, wherein the DVR that places the ad into the digital video output stream outputs the digital video output stream to a display device that is connected directly to the DVR, and wherein the ad wipes across a screen of the display device starting from a first side of the screen and ending at a second side of the screen without overlapping any portion of the index of programs recorded at the DVR or any portion of the video of the program recorded at the DVR; and thereafter, the DVR removing the index of programs recorded at the DVR from the digital video output stream and adding the video of the program recorded at the DVR to the digital video output stream so that the digital video output stream simultaneously includes the video of the program recorded at the DVR and the ad but does not include the index of programs recorded at the DVR.

2. The method of claim 1, wherein the ad is obtained in real-time.

3. The method of claim 1, wherein the ad is obtained by an ad placement engine within the DVR.

4. The method of claim 1,
wherein the ad is obtained by an ad placement engine within the DVR, and
wherein the ad placement engine uses previously collected user information to obtain the ad.

5. The method of claim 1,
wherein the ad is obtained by an ad placement engine within the DVR, and
wherein the ad placement engine uses context information and previously collected user information to obtain the ad.

6. The method of claim 5, wherein the context information comprises information selected from the group consisting of (i) time information, and (ii) a movie title.

7. The method of claim 1, wherein the ad is an animation.

8. The method of claim 1, wherein the ad is dynamically placed.

9. The method of claim 1,
wherein detecting that the digital video output stream should change from the index of programs recorded at the DVR to the video of the program recorded at the DVR is carried out by software of the DVR.

10. The method of claim 1,
wherein the ad is a still ad comprising an individual frame, the method further comprising:
replicating the individual frame a number of times to fill up a designated time segment that the ad is displayed.

11. The method of claim 1, further comprising:
after removing the index of the programs recorded at the DVR from the digital video output stream and adding the video of the program recorded at the DVR to the digital video output stream, removing the ad from the digital output stream so that the digital video output stream includes the video of the program recorded at the DVR but does not include the ad and the index of the programs recorded at the DVR.

12. The method of claim 1, wherein detecting that the digital video output stream should change from the index of the programs recorded at the DVR to the video of the program recorded at the DVR includes detecting that the program recorded at the DVR has been selected for playback.

13. The method of claim 1, further comprising:
wherein the display device connects to the DVR via a wired connection.

14. The method of claim 1, further comprising:
wherein the display device connects to the DVR via a wireless connection.

15. The method of claim 1, further comprising:
prior to obtaining the ad, downloading the ad from a server and storing the ad at a memory device of the DVR,
wherein the video of the program recorded at the DVR is stored at the memory device.

16. The method of claim 1,
wherein the ad wipes across the screen horizontally, and
wherein the first side of the screen is a left-most side of the screen, and the second side of the screen is a right-most side of the screen.

17. The method of claim 1, wherein the ad wipes across the screen vertically.

18. A computer software product having instructions stored on a non-transitory computer-readable medium and executable by a computer processor within a digital video recorder (DVR) to perform a method for placing an ad into a digital video output stream of the DVR, the computer software product comprising:
first instructions configured to cause the DVR to detect that the video output stream should change from an index of programs recorded at the DVR to video of a program recorded at the DVR, wherein the first instructions are executable while the digital video output stream of the DVR includes the index of programs recorded at the DVR but does not include the ad or the video of the program recorded at the DVR;
second instructions configured to cause the DVR to obtain the ad; and
third instructions configured to cause the DVR to place the ad into the digital video output stream so that the digital video output stream simultaneously includes the index of programs recorded at the DVR and the ad but does not include the video of the program recorded at the DVR, wherein the DVR that places the ad into digital video output stream outputs the digital video output stream to a display device that is connected directly to the DVR, and wherein the ad wipes across a screen of the display device starting from a first side of the screen and ending at a second side of the screen without overlapping any portion of the index of programs recorded at the DVR or any portion of the video of the program recorded at the DVR, and, thereafter, cause the DVR to remove the index of programs recorded at the DVR from the digital video output stream and to add the video of the program recorded at the DVR to the digital video output stream so that the digital video output stream simultaneously includes the video of the program recorded at the DVR and the ad but does not include the index of programs recorded at the DVR.

19. The computer software product of claim 18, wherein the first instructions detect that the video output stream should change from the index of the programs recorded at the DVR to the video of the program recorded at the DVR by detecting that the program recorded at the DVR has been selected for playback.

20. A method of placing an ad into a digital video output stream of a digital video recorder (DVR), the method comprising:
while the digital video output stream of the (DVR) includes an index of programs recorded at the DVR but does not include the ad or video of a program recorded at the DVR, the DVR detecting that the digital video output stream should change from the index of programs recorded at the DVR to the video of the program recorded at the DVR;
the DVR collecting user information including a geographic location;
the DVR obtaining the ad based on time information and the geographic location;
the DVR placing the ad into the digital video output stream so that the digital video output stream simultaneously includes the index of programs recorded at the DVR and the ad but does not include the video of the program recorded at the DVR, wherein the DVR that places the ad into the digital video output stream outputs the digital video output stream to a display device that is connected directly to the DVR, and wherein the ad wipes across a screen of the display device starting from a first side of the screen and ending at a second side of the screen without overlapping any portion of the index of programs recorded at the DVR or any portion of the video of the program recorded at the DVR; and
thereafter, the DVR removing the index of programs recorded at the DVR from the digital video output stream and adding the video of the program recorded at the DVR to the digital video output stream so that the digital video output stream simultaneously includes the video of the program recorded at the DVR and the ad but does not include the index of programs recorded at the DVR.

21. The method of claim 20, wherein the time information includes a current time and a time when a restaurant near the geographic location closes.

* * * * *

UNITED STATES PATENT AND TRADEMARK OFFICE
CERTIFICATE OF CORRECTION

Page 1 of 1

PATENT NO.           : 8,571,933 B2
APPLICATION NO.      : 10/033401
DATED                : October 29, 2013
INVENTOR(S)          : Rosenberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2810 days.

Signed and Sealed this
Seventh Day of April, 2015

Michelle K. Lee
*Director of the United States Patent and Trademark Office*